US011270328B1

(12) United States Patent
Cohen

(10) Patent No.: US 11,270,328 B1
(45) Date of Patent: Mar. 8, 2022

(54) METHOD AND SYSTEM THAT GIVES ANY BRAND OR RETAILER INSTANT VISIBILITY BY CROWD-SERVICING GROCERY SHOPPERS USING A PHOTO-BASED APP AND DASHBOARD

(71) Applicant: Ossie J Cohen, Long Beach, CA (US)

(72) Inventor: Ossie J Cohen, Long Beach, CA (US)

(*) Notice: Subject to any disclaimer, the term of this patent is extended or adjusted under 35 U.S.C. 154(b) by 7 days.

(21) Appl. No.: 16/878,394

(22) Filed: May 19, 2020

Related U.S. Application Data

(60) Provisional application No. 62/850,044, filed on May 20, 2019.

(51) Int. Cl.
| | | |
|---|---|---|
| *G06Q 30/00* | (2012.01) | |
| *G06Q 30/02* | (2012.01) | |
| *G06F 16/9537* | (2019.01) | |
| *G06Q 50/00* | (2012.01) | |
| *H04W 4/029* | (2018.01) | |

(52) U.S. Cl.
CPC ..... *G06Q 30/0215* (2013.01); *G06F 16/9537* (2019.01); *G06Q 30/0235* (2013.01); *G06Q 50/01* (2013.01); *H04W 4/029* (2018.02); *G06Q 30/0205* (2013.01)

(58) Field of Classification Search
CPC ........... G06Q 30/0215; G06Q 30/0235; G06Q 50/01; G06Q 30/0205; H04W 4/029; G06F 16/9537
See application file for complete search history.

(56) References Cited

U.S. PATENT DOCUMENTS

| | | | | |
|---|---|---|---|---|
| 10,664,777 | B2* | 5/2020 | Volkov | G06Q 10/063116 |
| 10,671,834 | B2* | 6/2020 | Adato | G06F 16/90335 |
| 2014/0278850 | A1* | 9/2014 | Boccuzzi, Jr. | G06Q 30/0208 705/14.11 |
| 2018/0341907 | A1* | 11/2018 | Tucker | G06Q 30/0623 |

OTHER PUBLICATIONS

Chen, 2014.*
Dam, 2013.*
Edelman, 2008.*
Goffman, 1974.*
Grier, 2005.*
Hayles, 2005.*
Kuhn, 1962.*
Lakoff, 1980.*
Mindell, 2015.*
Treffert, 2010.*
Wirth, 1976.*

* cited by examiner

*Primary Examiner* — David J Stoltenberg
*Assistant Examiner* — Michael I Ezewoko
(74) *Attorney, Agent, or Firm* — Plager Schack LLP; Mark H. Plager; Stephen Hallberg

(57) ABSTRACT

A method and a system that gives any brand or retailer instant visibility by crowd-servicing grocery shoppers using a photo based app and dashboard are disclosed. Instant visibility in 24 hours with no emails, calls and waiting for half the price on a monthly subscription, all delivered in a neat dashboard and created by grocery shoppers using the intuitive app technology.

7 Claims, 6 Drawing Sheets

METHOD AND SYSTEM THAT GIVES ANY BRAND OR RETAILER INSTANT VISIBILITY BY CROWD-SERVICING GROCERY SHOPPERS USING A PHOTO-BASED APP AND DASHBOARD

This application claims benefit to U.S. Provisional Patent Application 62/850,044, entitled "METHOD AND SYSTEM THAT GIVES ANY BRAND OR RETAILER INSTANT VISIBILITY BY CROWD-SERVICING GROCERY SHOPPERS USING A PHOTO-BASED APP AND DASHBOARD," filed May 20, 2019. The U.S. Provisional Patent Application 62/850,044 is incorporated herein by reference.

BACKGROUND

Embodiments of the invention described in this specification relate generally to brand marketing and exposure, and more particularly, to a crowd-servicing image-based brand visibility method for providing instant brand visibility and the crowd-servicing image-based brand visibility system that provides instant brand visibility.

Brands, companies, and retailers (hereinafter referred to individually as "brand" and collectively as "brands") currently rely on a network of sales reps, brokers, etc., to get visibility to products on shelves. For example, a cookie company wants to see photos of their products on a shelf at a grocery store, or maybe they want to negotiate space in a new store and want to see what the space looks like. The problem with this approach is that it takes a very long time for anyone or any company who is requesting such information to get answers, details, data, or other information that speaks to their request, conventionally taking at least two weeks and up to three months (or longer) using traditional work processes, labor pools, and/or experience. Brands simply cannot wait so long (i.e., 2 weeks-3 months) to get this valuable information to make their business decisions. Instead, brands need to know how things are executed in stores as fast as possible to remedy issues, protect sales, and increase viability to shoppers.

The conventional manner of handling this is for sales representatives ("sales reps") to physically travel to and visit stores. However, sales reps often have in excess of a hundred stores (e.g., 150 stores is common) to visit and do not have the bandwidth to understand what going on at all times. Furthermore, the conventional manner of dealing with brand visibility is by paying high fees to those sales reps. For instance, sales reps often command high 5-15% commissions, fees, expensive service costs, etc., and also tend to require special training and must engage in manual labor which means it's a long process to deliver results that are not instant for each store.

Brands also spend exorbitant amounts of money (e.g., millions or billions of dollars) on advertising just to engage consumers to try their products.

Existing systems have extensive, tedious, and complicated workflows and features, and are confusing due to their convoluted user interfaces, and in many cases, extensive training is needed to use and/or involve time consuming tasks that take 30-120 minutes to complete, but which pay low wages and require lots of extracurricular things like building displays and printing documents, making calls, sending emails, and training. Additionally, the existing systems have limited ability to scale into multiple different domains.

Therefore, what is needed is a way to provide brand visibility in a short turnaround time (say, within 24 hours) with no emails or calls that can all be accessed in a simple and convenient online interface of a system that requires little or no training to utilize and which provides crowdsourced brand visibility that is driven by regular customers and shoppers.

BRIEF DESCRIPTION

A novel crowd-servicing image-based brand visibility method for providing instant brand visibility and a novel crowd-servicing image-based brand visibility system that provides instant brand visibility are disclosed. In some embodiments, the crowd-servicing image-based brand visibility for providing instant brand visibility is implemented as a crowd-servicing image-based brand visibility software application. In some embodiments, the crowd-servicing image-based brand visibility software application includes an online dashboard. In some embodiments, the crowd-servicing image-based brand visibility software application is a mobile application ("mobile app") that gives brands and retailers instant visibility by crowd-servicing customers or shoppers capturing photos via the mobile app in connection with tasks broadcast by the brands and retailers via the online dashboard.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
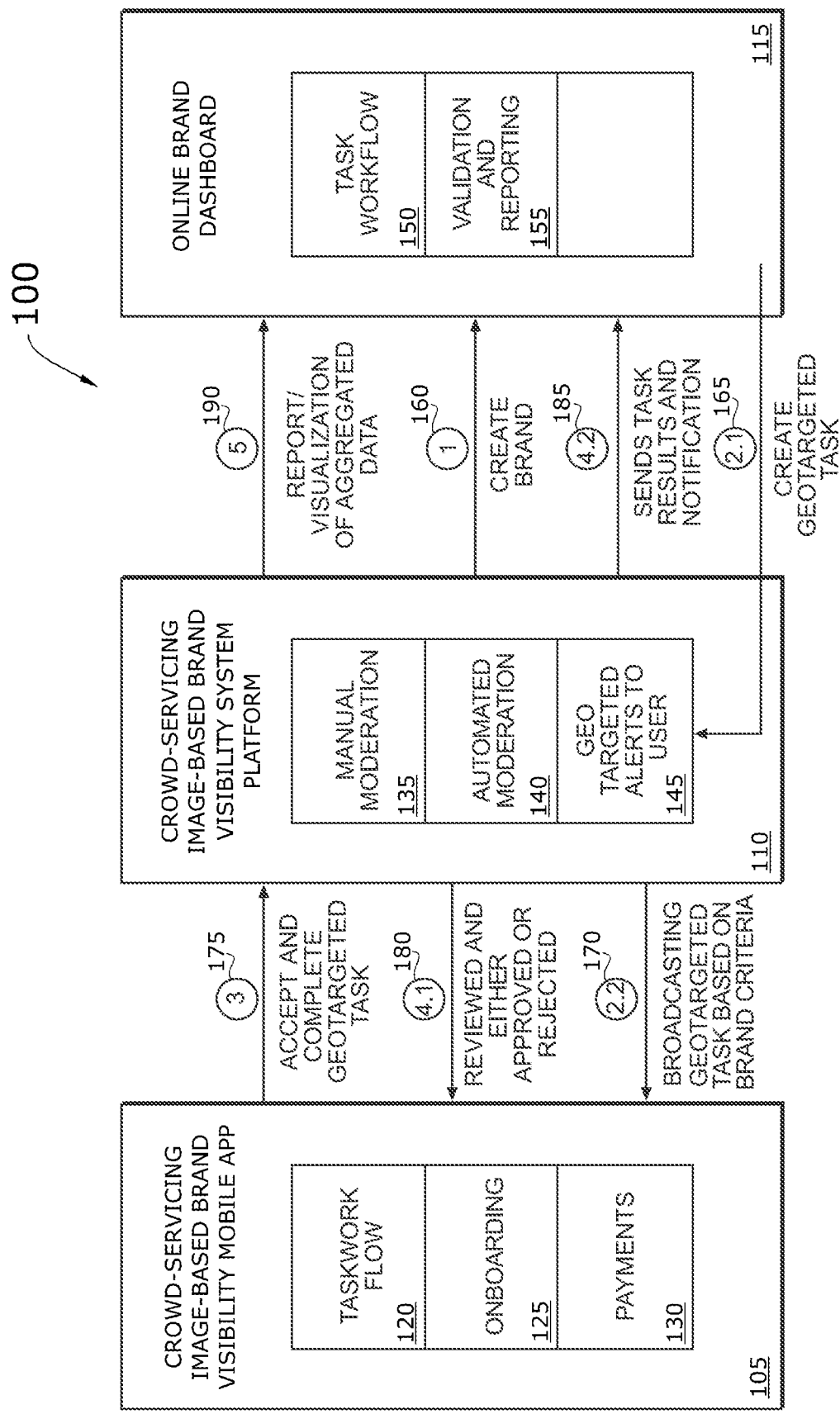
FIG. 1 conceptually illustrates a crowd-servicing image-based brand visibility system in some embodiments that provides instant brand visibility by way of an online dashboard and a mobile app that implements a crowd-servicing image-based brand visibility method for providing instant brand visibility.

In the following detailed description of the invention, numerous details, examples, and embodiments of the invention are described. However, it will be clear and apparent to one skilled in the art that the invention is not limited to the embodiments set forth and that the invention can be adapted for any of several applications. In addition, the present specification defines several terms, as follows:

Crowd-servicing, crowd-sourcing, and crowd-sourced are synonymous terms which relate to brand visibility action driven by multiple regular customers and shoppers.

Instant visibility in this specification means non-traditional brand visibility within a short time period as defined by a brand (e.g., turnaround time, say, within 24 hours).

Traditional brand visibility in this specification means conventional brand communication with customers and potential customers including email communications, voice call communications, and waiting for half the price on a monthly subscription.

Some embodiments of the invention include a novel crowd-servicing image-based brand visibility method for providing instant brand visibility and a novel crowd-servicing image-based brand visibility system that provides instant brand visibility. In some embodiments, the crowd-servicing image-based brand visibility for providing instant brand visibility is implemented as a crowd-servicing image-based brand visibility software application. In some embodiments, the crowd-servicing image-based brand visibility software application includes an online dashboard. In some embodiments, the crowd-servicing image-based brand visibility software application is a mobile application ("mobile app") that gives brands and retailers instant visibility by crowd-servicing customers or shoppers capturing photos via the mobile app in connection with tasks broadcast by the brands and retailers via the online dashboard.

As stated above, conventionally, brands and retailers currently rely on a network of sales reps, brokers, etc., to get visibility to products on shelves. The conventional system is very expensive and time consuming, typically taking 2-8 weeks to get relevant information, which is too much time for brands to make their business decisions. Instead, brands and retailers need to know how things are executed in stores as fast as possible to remedy issues, protect sales, and increase viability to shoppers. The conventional sales representative approach involves extensive travel and manual labor, but they do not have the bandwidth to understand what going on at all times, leaving brands and retailers in the dark at times (e.g., even at times when information is most needed/most urgent). Embodiments of the crowd-servicing image-based brand visibility method for providing instant brand visibility and the crowd-servicing image-based brand visibility system that provides instant brand visibility described in this specification solve such problems by providing global automated brand services that available on demand, 24 hours a day, and driven by actual customer/shoppers who provide imagery and information nearly instantaneously when requested (within 24 hour time window). When any brand or retailer request can be delivered within 24 hours for half the cost of conventional systems, the bulk of problems are solved. In essence, the crowd-servicing customers and shoppers can complete tasks take less than five minutes to complete and provide valuable information to brands and retailers. When many customers and shoppers are engaged in completing these tasks, the turnaround time is not increased at all, but the amount of valuable information increased dramatically (e.g., provides volumes of visual, image-based data and other analytic data in same 24 hour time span). In some embodiments, the customers and shoppers get paid a fee for each task that is completed (and accepted as complete). For example, customer and shoppers may be paid five dollars for completion of each task, which may involve taking pictures or otherwise gathering location-based information wanted by a brand. In addition, customers and shoppers gain the benefit of being introduced to new products when engaged in completing a task and/or may discover new stores. This is beneficial to retailers and brands, as well, since the more exposure brands and retailers get, the greater the chance for increasing sales for everyone involved in the ecosystem.

In some embodiments, the crowd-servicing image-based brand visibility method for providing instant brand visibility and the crowd-servicing image-based brand visibility system that provides instant brand visibility dramatically reduces the turnaround time it takes to get any visual data and/or other information at a fraction of the cost using everyday people, instead of having to resort to traditional models that involve antiquated technology or no technology and field work forces which involve long turnaround times, taking anywhere from two weeks to three months for task turnaround and at an expensive cost.

In some embodiments, the crowd-servicing image-based brand visibility method for providing instant brand visibility and the crowd-servicing image-based brand visibility system that provides instant brand visibility also generates inbound targeted audiences for whomever wants to connect with potential consumers in their industry. For example, the crowd-servicing image-based brand visibility method for providing instant brand visibility and the crowd-servicing image-based brand visibility system that provides instant brand visibility drives people to targeted stores and introduces them to various products and stores of which they may not be aware, instead of having to spend millions/billions on advertising to increase brand awareness and sales or to get them to try a product.

Embodiments of the crowd-servicing image-based brand visibility method for providing instant brand visibility and the crowd-servicing image-based brand visibility system that provides instant brand visibility described in this specification differ from and improve upon currently existing options. In particular, some embodiments differ from the conventional system of employing or contracting with seasoned sales reps. In contrast, the system and method of the present disclosure involves shoppers and customers with no particular amount of experience or expertise. In fact, anyone from high school kid to senior citizen can use the platform and earn a fee (e.g., $5.00) per completed task. With no requirement for special training, this is further enticing to many shoppers and customers since everyone loves taking photos. Furthermore, there is no major commitment involved for customers and shoppers since it is estimated that at least one in every seven adults is present in a store at any given moment of time. All these normal shoppers and customers need is a smartphone mobile device with a camera, and a little bit of time (e.g., five minutes is typical) to accept and complete a task.

In addition, some embodiments improve upon the currently existing conventional options by providing data nearly instantaneously, thereby allowing brands and retailers to make time-urgent business decisions quickly. The reality is that brands and retailers cannot wait 2-8 weeks to get visual confirmation of things in stores. By that time, for example a sale may be over or they have moved on to another project. Things are extremely time sensitive in retail and if brands lose time they can lose shelf space. Thus, the ability to provide instant visibility in 24 hours with no emails, calls, and waiting for half the price on a monthly subscription, and by delivering all data and information via a convenient online dashboard, as well as allowing brands and retailers to make such requests for crowd-serviced data which customers and shoppers can answer to via an intuitive mobile app.

Furthermore, the crowd-servicing image-based brand visibility method for providing instant brand visibility and the crowd-servicing image-based brand visibility system that provides instant brand visibility has instant direct touchpoints and connections to people. Specifically, every time a person does a task, that person automatically gets introduced to a store and products by virtue of the person simply doing the task and also by having constant feed of brands and stores in the system that they see as they look for tasks versus companies trying to connect with them via social media and commercials and advertising. By contrast, existing conventional systems are static systems and must be used with their current workforce and/or trained personnel and not applicable to further analysis of the user's data and give them insight to consumers' behavior. Nor are they able to gather first party data, since they are not equipped with simplified user interfaces that allow for fast on-boarding, and not designed for everyday people to use and get paid instantly. By receiving and aggregating (via crowd sourcing) first party data that is captured by everyday shoppers, the information and data provided to the brand is more powerful for brand-related research analysis while also connecting directly to the consumers.

The crowd-servicing image-based brand visibility method for providing instant brand visibility and the crowd-servicing image-based brand visibility system that provides instant brand visibility of the present disclosure may be comprised of the following elements. This list of possible constituent elements is intended to be exemplary only and it is not intended that this list be used to limit the crowd-servicing image-based brand visibility method for providing instant brand visibility and the crowd-servicing image-based brand visibility system that provides instant brand visibility of the present application to just these elements. Persons having ordinary skill in the art relevant to the present disclosure may understand there to be equivalent elements that may be substituted within the present disclosure without changing the essential function or operation of the crowd-servicing image-based brand visibility method for providing instant brand visibility and the crowd-servicing image-based brand visibility system that provides instant brand visibility.

1. Brands login to dashboard and perform a few easy steps to blast their requests to a network of shoppers or customers located anywhere.

2. Shoppers and customers receive alerts on their mobile device (via the mobile app) based on their realtime ascertained geolocation and, upon accepting a task for alert, complete photo-based tasks that involve a small time commitment (e.g., under 5 minutes is typical) using the intuitive wizard in the app that guides them through the process.

3. A middle-tier management platform (hereinafter referred to as the "middle-tier", the "management platform", and/or the "crowd-servicing image-based brand visibility system platform") receives the submission(s) from customers or shoppers in an administration panel, reviews the submission(s), and confirms whether the submission(s) include the correct information or right type of information and either approves (when all the information is acceptable) or rejects (when there are problems that render the submission unacceptable) the submission(s).

4. Shopper or customer gets approval alert and is paid the fee amount (e.g., $5.00), which is automatically transferred to and deposited in a bank account provided by the customer or shopper upon installation of the mobile app. Alternatively, the shopper/customer can get a rejection notification in cases when the task is incomplete or not completed correctly.

5. Brands get approved tasks on a dashboard neatly packaged for review of photos along with a timeline of each shopper who completed the task.

The various elements of the crowd-servicing image-based brand visibility method for providing instant brand visibility and the crowd-servicing image-based brand visibility system that provides instant brand visibility of the present disclosure may be related in the following exemplary fashion. It is not intended to limit the scope or nature of the relationships between the various elements and the following examples are presented as illustrative examples only. The core functionality here is between steps 1, 2, and 3. The true relationship is between these three steps in any order as it connects brands/retailers, shoppers/customers, and the middle-tier administration controlling the process of instant viability using the platform. Steps 4 and 5 are more about paying the shopper/customer the fee amount, as well as approval for brand to see on the dashboard. However, if step 3 does not happen the system will regenerate and start the process over again from steps 1, 2, and 3 before it returning to steps 4 and 5. For example, when a shopper does incorrect task at step 2, the task will get rejected by step 3 and the process will return to step 1 automatically, followed by step 2 happening again. Furthermore, step 5 is critical as its design and functionality are directly related back to steps 1 and 2 that provide key data to the shoppers and tasks performed for the brands and retailers. Step 5 is, in essence, at the same place as step 1 where brands blast out signals for step 2 to occur but also same place when they see results from step 4.

The crowd-servicing image-based brand visibility method for providing instant brand visibility and the crowd-servicing image-based brand visibility system that provides instant brand visibility of the present disclosure generally works by the steps and components described above. The dashboard works individually as a home base for the brands and retailers to house their data and photos in a specific organized fashion. The dashboard also acts as the takeoff point to blast out tasks or micro-tasks to the shoppers to get them to complete the micro-tasks. The middle-tier admin panel is between brand/retailer and customer/shopper. Thus, the admin panel is in the middle watching the system, approving the photos, evaluating, and rating the shoppers and communication with everyone. It is a middle-tier network (cloud-based) control panel, in the middle between brands and shoppers. In addition, the mobile app includes a new specific wizard-type technology that can guide any user through the process with no experience necessary resulting in sterling results. The mobile app is also the place that houses all the information for the shoppers for their income, maps for available jobs, etc. In some embodiments, if step 2 does not occur then step 1 will be redone automatically. In some embodiments, if step 3 is a rejection of the step 2 then step 1 will be automatically sent again for step 2 to re-occur until approval and then step 3 will occur.

To make the crowd-servicing image-based brand visibility method for providing instant brand visibility and the crowd-servicing image-based brand visibility system that provides instant brand visibility of the present disclosure, a person may design the three parts of the system, including the middle-tier administration panel, the brand/retailer dashboard, and the mobile app for customers/shoppers using various design applications and programming languages. The person would also need to consider design and development issues related to user registration (for both shoppers/customers and brands/retailers), high volume data accesses and transfers, and privacy issues related to banking account information and payment transfers, etc. The person would ultimately need to code or manage a team of coders who would need to use various coding systems to build all three parts of the system from scratch to function together in unison. In some embodiments, integration with one or more big Internet sites would add to the functionality. For example, integration with Amazon or Google, using the new AI feature that will auto extract info from photos, and that way photos will be auto approved in the admin panel and become a faster process than human reviewing the info. In some embodiments, the system also supports tasks being created and generated from the shopper/customer, so they would use the mobile app to blast an alert of an issue in a store to the brand and we should still capture in the middle to approve.

By way of example, FIG. 1 conceptually illustrates a crowd-servicing image-based brand visibility system 100 that provides instant brand visibility by way of an online dashboard and a mobile app that implements the crowd-servicing image-based brand visibility method for providing instant brand visibility. As shown in this figure, the crowd-servicing image-based brand visibility system 100 includes three main components: a crowd-servicing image-based brand visibility mobile app 105, a crowd-servicing image-based brand visibility system platform 110, and an online brand dashboard 115. While the components of the crowd-servicing image-based brand visibility system 100 perform different aspects and perform (implement) various workflows, they all share information with each other and typically work together in unison. Specifically, each component works together to exchange data and information to accomplish the final objective which to capture visual imagery and textual information ("user-provided task data") via the crowd-servicing image-based brand visibility mobile app 105 and deliver the user-provided task data to the crowd-servicing image-based brand visibility system platform 110 which then analyzes the user-provided task data using various methods to deliver results to the online brand dashboard 115 for review by the brand (i.e., the respective customer, which is a brand, a retailer, or any other entity seeking to increase visibility).

Each of the three components include sub-components which are utilized to carry out operations of each respective component. Specifically, the crowd-servicing image-based brand visibility mobile app 105 includes a task acceptance-to-completion workflow module 120 (e.g., a task component workflow with self-guided wizard that guides the task completion process), a task onboarding module 125, and a payments module 130 (which allows for instant cashout for user). The crowd-servicing image-based brand visibility system platform 110 includes a manual moderation task validation module 135, an automated AI-based task moderation module 140, and a geotargeted user alert broadcast module 145. Rounding out the specific details of the three components of the crowd-servicing image-based brand visibility system 100, the online brand dashboard 115 includes a task creation workflow module 150 and a validation and reporting module 155.

Collectively, the three components of the crowd-servicing image-based brand visibility system 100 performs steps to carry out the crowd-servicing image-based brand visibility method for providing instant brand visibility. The crowd-servicing image-based brand visibility method starts by creating a brand (at 160) at the crowd-servicing image-based brand visibility system platform 110. The brand may be created, for example, by an administrator (or super administrator) of the crowd-servicing image-based brand visibility system platform 110. The brand may be created on behalf of a retailer or product manufacturer, or another entity seeking to enhance brand visibility or recognition. When the brand is created, a particular online brand dashboard is provided for the brand (only) and is accessible to the brand users, who are typically authorized agents or employees of the brand.

Once the particular online brand dashboard is provided to the brand, a brand user is able to easily create a geotargeted task (at 165) by using tools available through the task creation workflow module 150. In some embodiments, instead of a brand user creating the geotargeted task, an administrator or super administrator of the crowd-servicing image-based brand visibility system platform 110 creates the geotargeted task on behalf of the brand. After the geotargeted task is created (at 165), the particular online brand dashboard provides the task to the crowd-servicing image-based brand visibility system platform 110 for broadcast by way of the geotargeted user alert broadcast module 145. Specifically, the geotargeted user alert broadcast module 145 reviews geographical information about the task (as provided by the brand user) and then constrains the broadcasting of the geotargeted task alert to the users (at 170) in the noted geographical area. For example, the geographical information may include a zip code, a region (e.g., Los Angeles County, San Francisco Bay Area, Upper Peninsula of Michigan, South Florida, etc.), etc., or may be more specific, such as a radial distance around all locations of a specific type of store in an area or region (e.g., within ½ mile of grocery stores in Long Beach, Calif.), and/or based on other brand criteria.

Any user who is present within the location in the noted geographical area would receive an alert message about the new task. The crowd-servicing image-based brand visibility mobile app 105 running on each user's mobile device would trigger the alert to allow the user to review the task details, and if accepted by the user, would be loaded into the crowd-servicing image-based brand visibility mobile app 105 via the task onboarding module 125. In some cases, the task onboarding module 125 would place the task in a pending task queue (or list) and would leave it in the list until either the task expires or the task is completed and submitted for review/approval. The task acceptance-to-completion workflow module 120 of the crowd-servicing image-based brand visibility mobile app 105 would manage the steps for the user to complete the task. As such, the task acceptance-to-completion workflow module 120 of the crowd-servicing image-based brand visibility mobile app 105 sends task notifications (at 175) to the crowd-servicing image-based brand visibility system platform 110 when the user accepts the task and when (if) the user completes the task. In some embodiments, the task completion notification includes all required task data, including imagery captured by the user's mobile device camera and other information that may have been requested, such as textual information which the user inputs.

Once the task completion notification is received, the crowd-servicing image-based brand visibility system platform 110 performs operations to analyze and validate the data provided by the user for the completed task. The specific task may be a type of task which can be reviewed and validated only by way of the manual moderation task validation module 135 (which may involve interaction of the administrator or super administrator), while other completed tasks can be automatically reviewed and validated by the automated AI-based task moderation module 140. In some embodiments, the completed task may be reviewed and validated first by the automated AI-based task moderation module 140, and then by the administrator or super administrator via interaction with the manual moderation task validation module 135. This way, additional validation is provided when needed by the brand or certain tasks. After review and validation checking is completed (by way of either the manual moderation task validation module 135 or the automated AI-based task moderation module 140), then the completed task is approved or rejected. For example, an incomplete task is rejected, while a completed task that includes all required information in a clearly understandable way is approved. Then the crowd-servicing image-based brand visibility system platform 110 sends either the approval or the rejection to the user (at 180) and also sends task results (if approved) and approval notification to the particular online brand dashboard 115. The particular online brand dashboard 115 would then generate a report (at 190) by way of the validation and reporting module 155. The report would incorporate the task results and imagery to provide a full visual report of the aggregated task data from all users who completed the task.

Several more detailed examples of processes that carry out steps of the crowd-servicing image-based brand visibility method for providing instant brand visibility are described next.

In some embodiments, the crowd-servicing image-based brand visibility method includes a plurality of task creation and broadcasting steps comprising (i) creating a product page (or other as needed for a category for task/request), (ii) creating a task and choosing a category (via product page) to broadcast to users, (iii) selecting a time frame for turnaround of the task, (iv) selecting task data deliverables that are required for completion of the task (e.g., photos, visual data, text information, numeric information, empirical observation information, etc.), (v) selecting one or more geographical location(s) within which the data needs to be collected via geo-targeted location, and (vi) broadcasting the task to users based on their present locations (matching the geo-location selected or defined).

Figure 2:
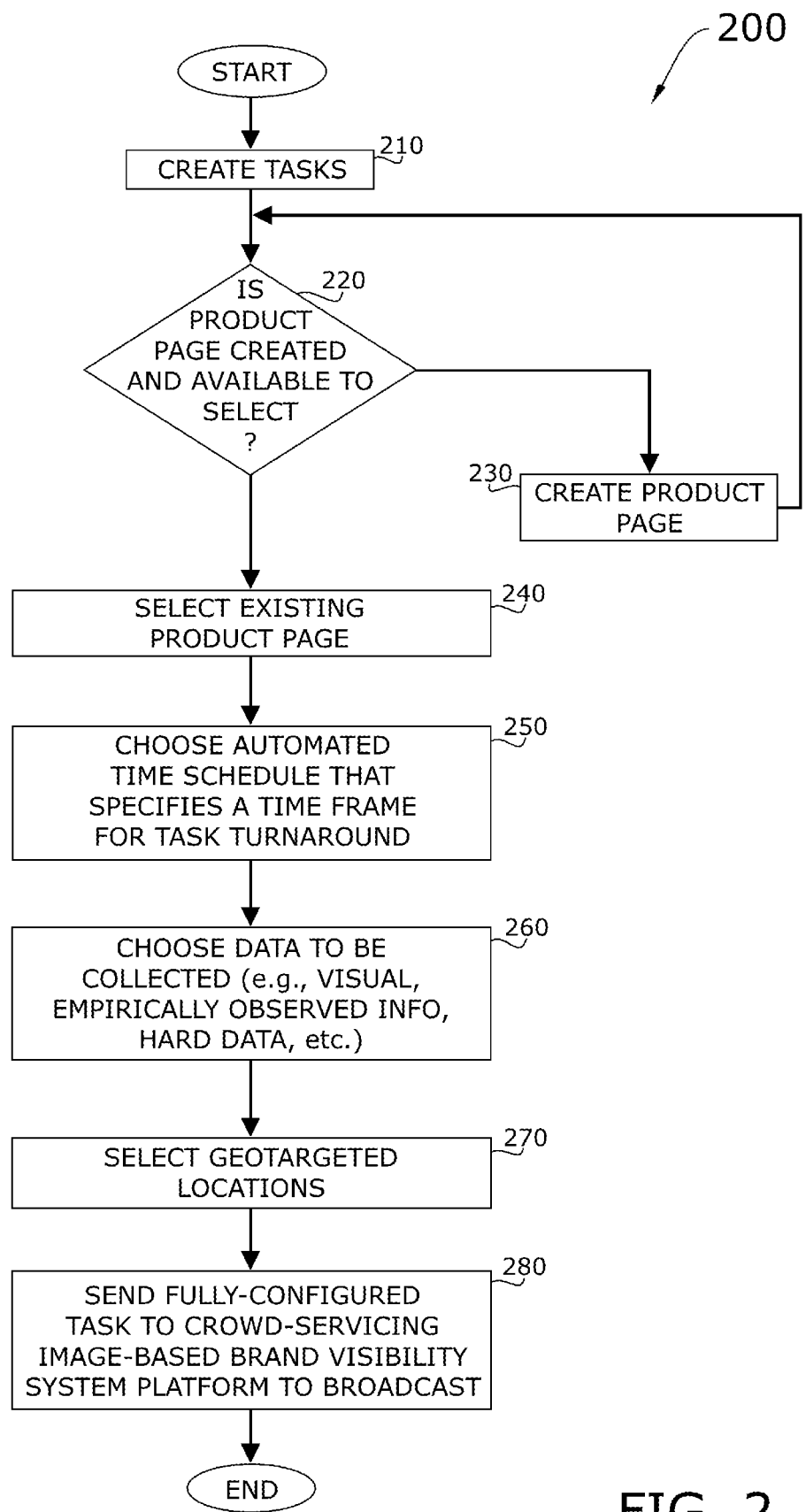
FIG. 2 conceptually illustrates a brand dashboard process for creating and broadcasting a geotargeted task based on brand criteria in some embodiments.

By way of example, FIG. 2 conceptually illustrates a brand dashboard process for creating and broadcasting a geotargeted task based on brand criteria 200. In some embodiments, the brand dashboard process for creating and broadcasting a geotargeted task based on brand criteria 200 provides several detailed steps that carry out the steps for creating and broadcasting a geotargeted task (at 165 and 170) described above by reference to FIG. 1. In some embodiments, the brand dashboard process for creating and broadcasting a geotargeted task based on brand criteria 200 is performed by way of the online brand dashboard as an implementation of the plurality of task creation and broadcasting steps of the crowd-servicing image-based brand visibility method noted above. As shown in this figure, the brand dashboard process for creating and broadcasting a geotargeted task based on brand criteria 200 starts to create tasks (at 210). Tasks are created when a brand (or an agent, employee, or brand user) interacts with the online brand dashboard via selection of a task creation tool (or button), or when an administrator or super administrator creates a task on behalf of the brand. Another alternative for creating tasks is by voice command (e.g., through a voice recognition system that is integrated with the online brand dashboard).

In some embodiments, the brand dashboard process for creating and broadcasting a geotargeted task based on brand criteria 200 determines (at 220) whether a product page is already created and is available for selection. When a particular product page does not yet exist, the brand dashboard process for creating and broadcasting a geotargeted task based on brand criteria 200 proceeds to the next step of creating the particular product page (at 230), and then reverts back to the determination at which the particular product page is available for selection. On the other hand, when the product page already exists and is available for selection, then the brand dashboard process for creating and broadcasting a geotargeted task based on brand criteria 200 continues forward to a step for selecting the product page (at 240). In some embodiments, the brand dashboard process for creating and broadcasting a geotargeted task based on brand criteria 200 allows the user to choose or select the automated time schedule for task turnaround (at 250). In this way, the user specifies a turnaround time frame in which all users who accept the task must complete the requirements of the task to be approved. Next, the user chooses data to be collected (at 260). The brand dashboard process for creating and broadcasting a geotargeted task based on brand criteria 200 accepts a variety of data type selections including, without limitation, visual data, photo/image capture data, text information, numerical information, empirical observation details and information, etc.

In some embodiments, the brand dashboard process for creating and broadcasting a geotargeted task based on brand criteria 200 continues to a final stage of task creation by selection of geotargeted locations (at 270). The geotargeted locations constrain the broadcasting of the task to only users within the defined geographical location. Thus, the brand dashboard process for creating and broadcasting a geotargeted task based on brand criteria 200 sends (at 280) the fully configured task to the crowd-servicing image-based brand visibility system platform for broadcast to users in the selected geotargeted locations. Then the brand dashboard process for creating and broadcasting a geotargeted task based on brand criteria 200 ends.

To use the crowd-servicing image-based brand visibility method for providing instant brand visibility and the crowd-servicing image-based brand visibility system that provides instant brand visibility of the present disclosure, for example, a cookie brand is in all the whole foods and they need to know right now, not in two-twelve or more weeks, what is going on with their products on shelf. The stores have not been ordering for a while or there was a price change or they are on sale or there is a new flavor they released, etc. When blasted out as a request to shoppers, the alert will be triggered on the shopper's mobile, thereby allowing shoppers to grab the alert off the mobile app. In some embodiments, once a shopper take a task, is disappears and no one else can do it. The task is completed and reviewed (middle-tier admin panel), which when approved, gives results to the brand/retailer within minutes or hours.

Figure 3:
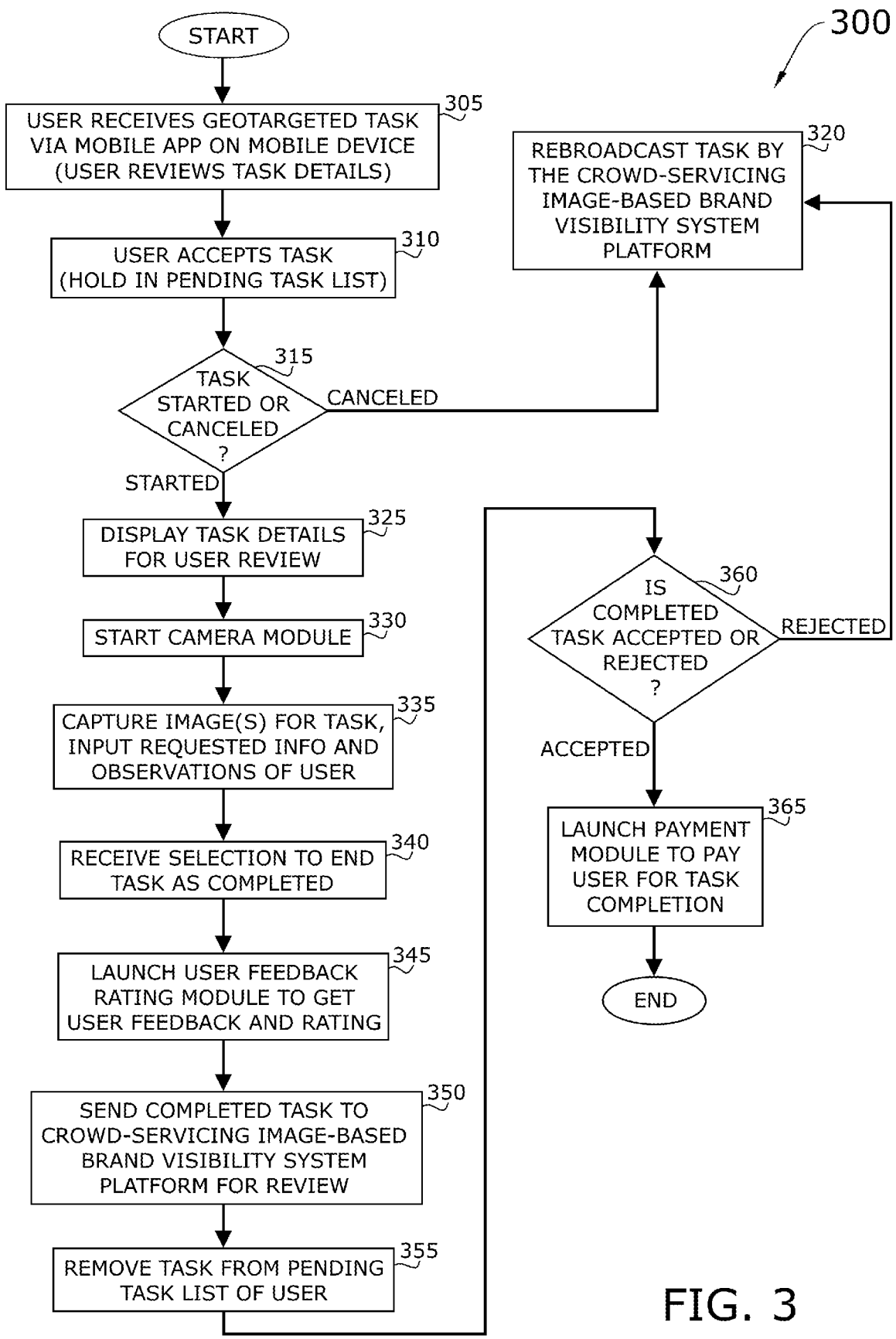
FIG. 3 conceptually illustrates a user task acceptance process for receiving, accepting, and completing a brand broadcast geotargeted task in some embodiments.

By way of example, FIG. 3 conceptually illustrates a user task acceptance process for receiving, accepting, and completing a brand broadcast geotargeted task 300. The user task acceptance process for receiving, accepting, and completing a brand broadcast geotargeted task 300 provides several detailed steps that carry out the steps for accepting and completing a geotargeted task (at 175) described above by reference to FIG. 1. As shown in this figure, the user task acceptance process for receiving, accepting, and completing a brand broadcast geotargeted task 300 is largely related to a customer or a shopper (a "user") with a camera-enabled mobile device that is running the mobile app. Thus, the user receives a geotargeted task (at 305) through the mobile app on the mobile device. In this example, the user is present in a particular geotargeted area defined in the task that is received. The user can review notes about the task as a preliminary step. Next, if the user decides to perform the task, the user accepts the task (at 310) through a selection in the mobile app (or via the notification). Upon acceptance by the user, the mobile app saves the task in a pending task list within the mobile app. Next, the user task acceptance process for receiving, accepting, and completing a brand broadcast geotargeted task 300 determines (at 315) whether to start the task or cancel the task. For example, the user may cancel the task by 'deleting' the task from the pending task list or select the task to start working on the requirements for completing the task. When the task is canceled, the task is rebroadcast (at 320) by the crowd-servicing image-based brand visibility system platform 110.

On the other hand, when the user starts the task, the user task acceptance process for receiving, accepting, and completing a brand broadcast geotargeted task 300 displays details of the task (at 325) for the user to review in detail. Next, the user task acceptance process for receiving, accepting, and completing a brand broadcast geotargeted task 300 starts a camera module (at 330) that includes a command interface to the embedded or onboard camera of the user's mobile device. Although some of the steps of the user task acceptance process for receiving, accepting, and completing a brand broadcast geotargeted task 300 are automatically triggered in near realtime, it may be the case that a certain amount of time passes so that the user may travel to a more specific location to carry out the task requirements (e.g., the user may be presently located a ¼ mile away from a store in which the task may be completed, and therefore, may travel to the store before starting the remaining steps of the user task acceptance process for receiving, accepting, and completing a brand broadcast geotargeted task 300). Thus, when the user is at a location in which the requirements of the task may be carried out, the user will then use the mobile app to capture one or more image(s), input requesting information, and provide empirical observations (at 335) as directed by the task requirements. When the user is satisfied that the task requirements have been completed, the user may then submit the task as completed. Thus, the user task acceptance process for receiving, accepting, and completing a brand broadcast geotargeted task 300 receives the user selection (at 340) to end the task as completed.

After completion of the task, the user task acceptance process for receiving, accepting, and completing a brand broadcast geotargeted task 300 of some embodiments launches a user feedback rating module (at 345) to get user feedback and ratings information. Whether user feedback/ratings information is provided or not, the user task acceptance process for receiving, accepting, and completing a brand broadcast geotargeted task 300 sends the completed task (at 350) to the crowd-servicing image-based brand visibility system platform 110 for review. Review may be conducted automatically (by the automated AI-based task moderation module 140), manually (by an agent of the brand, an administrator, or a super administrator on behalf of the brand via interaction with the manual moderation task validation module 135), or both automatically and manually (as a double review). Also after completion of the task, the user task acceptance process for receiving, accepting, and completing a brand broadcast geotargeted task 300 of some embodiments removes the task from the pending task list (at 355) in the mobile app for the user.

In some embodiments, the user task acceptance process for receiving, accepting, and completing a brand broadcast geotargeted task 300 continues to the next step of determining (at 360) whether the completed task is accepted or rejected by the crowd-servicing image-based brand visibility system platform 110. When rejected, the user task acceptance process for receiving, accepting, and completing a brand broadcast geotargeted task 300 rebroadcasts the task (at 320) by the crowd-servicing image-based brand visibility system platform 110. On the other hand, when the completed task is approved/accepted, the user task acceptance process for receiving, accepting, and completing a brand broadcast geotargeted task 300 launches a payment module (at 365) to automatically and instantly pay the user for task completion. In some embodiments, the payment module is configured to retrieve bank routing information provided by the user through the mobile app, and to perform an electronic deposit of the brand-specified amount into the user's bank account or other financial account. Then the user task acceptance process for receiving, accepting, and completing a brand broadcast geotargeted task 300 ends.

In this way, when a person (customer/shopper) wants to make extra money after work or pay for lunch, etc., the person can just grab some quick tasks (if and when blasted out), complete them at a nearby store, and move on with their day. Many possibilities can arise from this scenario. For instance, it is possible for a couple to go on a task-blast-completion date during which they save alerts during the day and then when they get home they go to a store associated with the alerts (e.g., Whole Foods, Costco, Target, etc.) and make money for date night. During the process they also discover new brands, new stores, and make purchases which also help increase sales for stores, so people do not just buy everything online.

Figure 4:
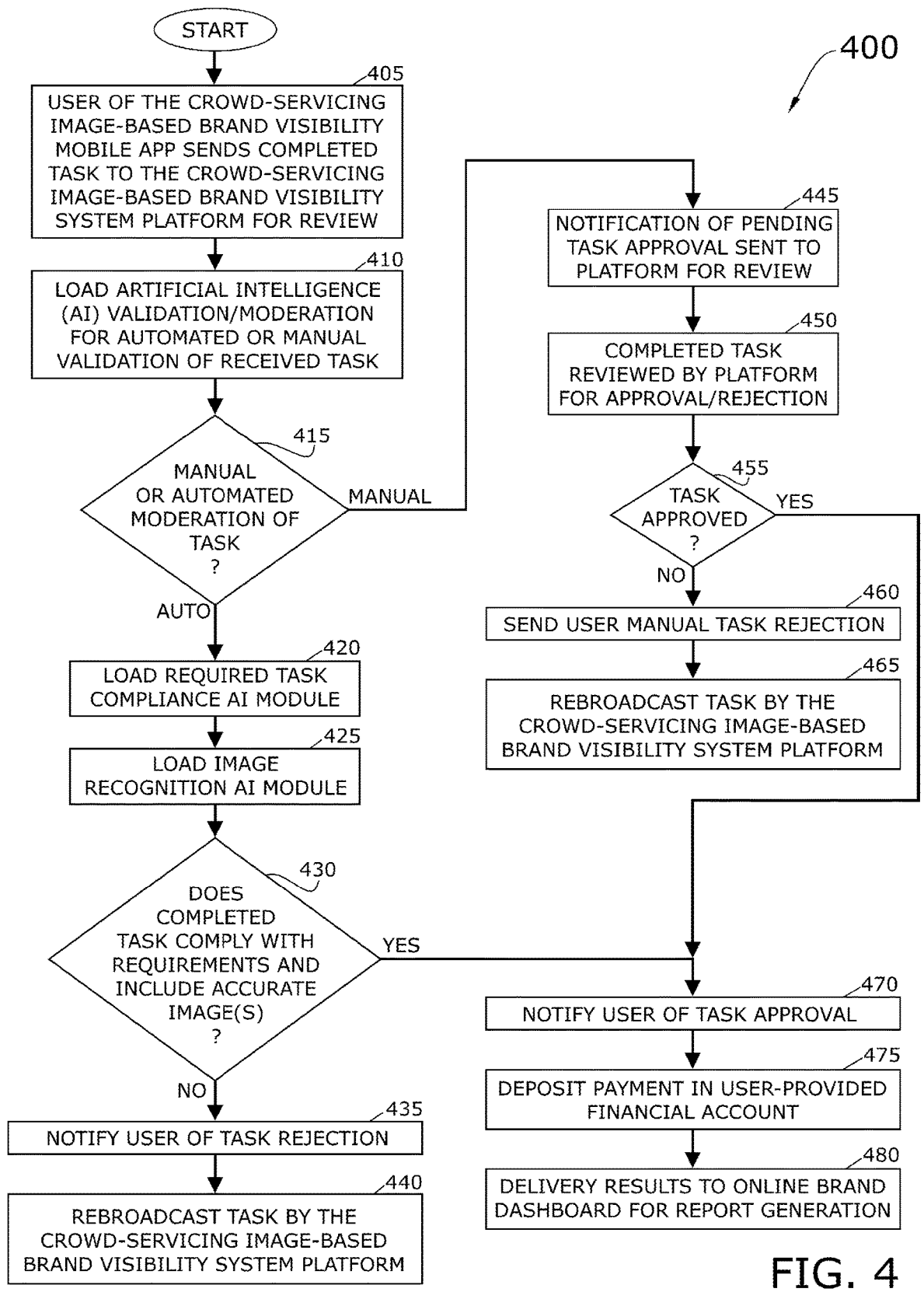
FIG. 4 conceptually illustrates a completed task validation process in some embodiments.

Now turning to another example, FIG. 4 conceptually illustrates a completed task validation process 400. The completed task validation process 400 provides several detailed steps that carry out the steps for task validation and report generation (at 180, 185, and 190) described above by reference to FIG. 1. As shown in this figure, the completed task validation process 400 starts when a user of the crowd-servicing image-based brand visibility mobile app 105 sends a completed task to the crowd-servicing image-based brand visibility system platform 110 for review (at 405). When the completed task is received for review, the completed task validation process 400 loads an artificial intelligence (AI) validation/moderation for automated or manual validation of the received task (at 410). Next, the completed task validation process 400 determines (at 415) whether to perform manual moderation/validation or automated moderation/validation of the completed task. In some embodiments, the task defines whether automated moderation/validation is supported, or whether manual moderation/validation is to be performed. In some cases, both automated and manual moderation/validation of the completed task is performed, as described above.

When manual moderation/validation of the completed task is determined (at 415), the completed task validation process 400 proceeds to a step for notifying the brand of a pending task approval review (at 445), which is described in further detail below. However, when automated moderation/ validation of the completed task is determined (at 415), the completed task validation process 400 loads a required task compliance AI module (at 420) and loads an image recognition AI module (at 425). In some embodiments, the required task compliance AI module retrieves a list of the requirements for the task and compares the retrieved list of task requirements with the completed task items. In some embodiments, the image recognition AI module uses an artificial intelligence engine and machine learning subsystem to identify image elements within user-submitted photos and compare the image elements to one or more expected image elements assigned for an image requirement of the task.

After comparing the completed items of the task with the list of requirements for the task and after determining whether the image elements in the user-submitted image(s) comply with the expected image elements for the task, the completed task validation process 400 of some embodiments determines (at 430) whether the completed task complies with the requirements of the task as specified during brand creation of the task and whether the image is accurate enough to proceed. When the task requirements are fully satisfied by the completed task submitted by the user, the completed task validation process 400 notifies the user of task approval (at 470) and proceeds accordingly, which is described in further detail below. However, when the task requirements are not satisfied, the completed task validation process 400 notifies the user of task rejection (at 435). Then the completed task validation process 400 rebroadcasts (at 440) the task by way of the crowd-servicing image-based brand visibility system platform 110.

Turning back to the determination (at 415) of whether manual or automated moderation/validation of the task is needed, when the completed task validation process 400 determines that manual moderation/validation is needed, then the completed task validation process 400 notifies the brand that a manual task approval review (at 445) is pending. In some embodiments, an administrator is notified on behalf of the brand or a super administrator is notified on behalf of the brand. Next, the completed task validation process 400 proceeds to the next step at which an agent for the brand manually reviews the completed task (at 450). Again, the agent for the brand may be an employee of the brand or an administrator or super administrator non-employee user who is designated to manually review completed tasks on behalf of the brand. In some embodiments, the completed task validation process 400 then determines (at 455) whether the task is approved. When the task is not approved, the completed task validation process 400 sends the user a manual task review rejection notification (at 460) and then rebroadcasts (at 440) the task by way of the crowd-servicing image-based brand visibility system platform 110. However, when the completed task is approved after manual review, the completed task validation process 400 transitions to the step for notifying the user of task approval (at 470), which is the same step that is performed after determining (at 430) that the task is fully compliant with the requirements set out in the task as created and broadcast originally. Next, the completed task validation process 400 deposits payment (at 475) in the user-provided financial account and delivers the results of the completed task to the online brand dashboard (at 480) for report generation and data aggregation.

Many of the descriptions and examples noted above relate to processes, methods, modules, mobile apps, software, online dashboards, and other such implement ions of the invention. However, in some embodiments, the crowd-servicing image-based brand visibility system that provides instant brand visibility is deployed as a cloud-computing system. An example of such a cloud-computing system is described next.

Figure 5:
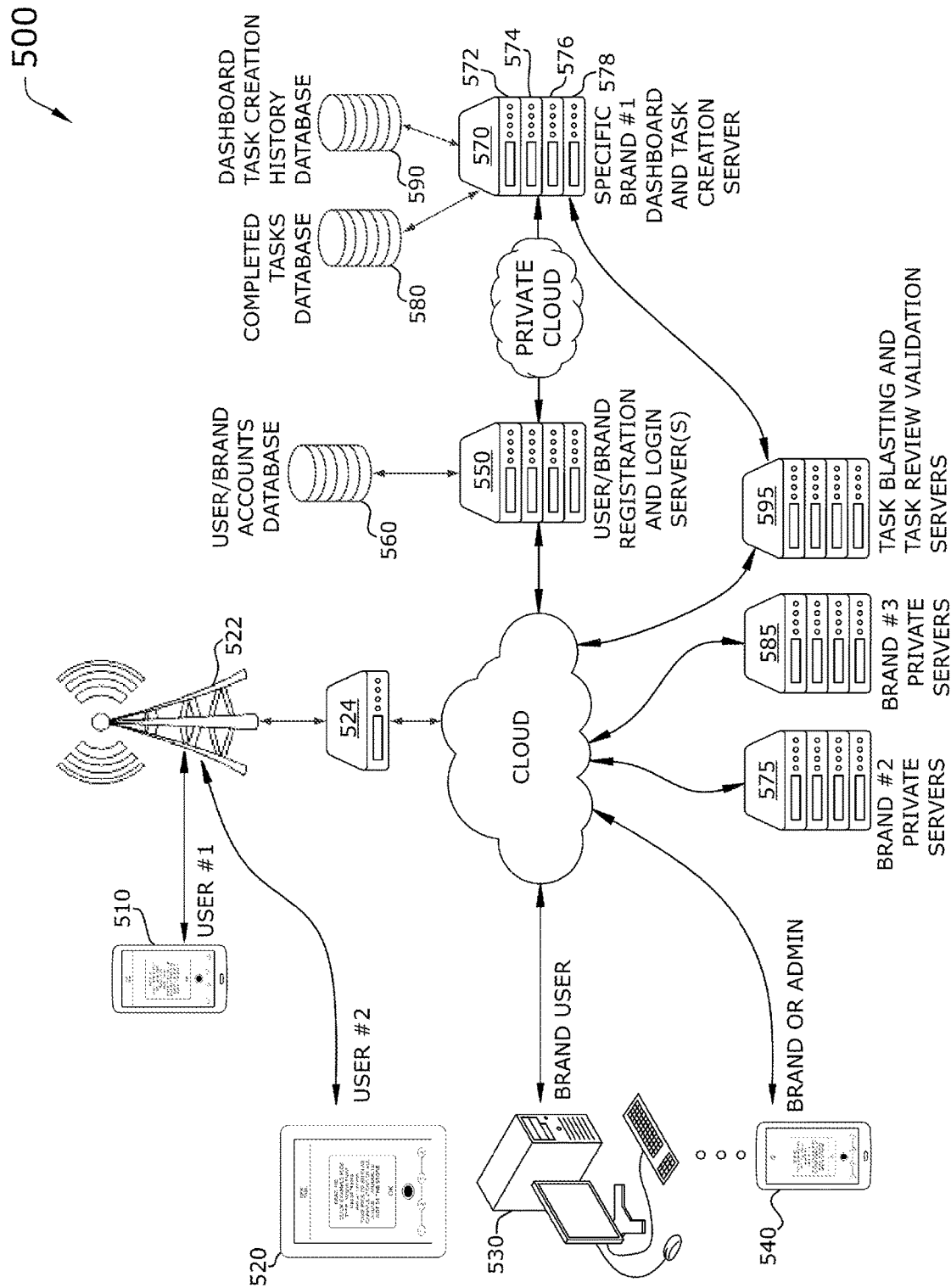
FIG. 5 conceptually illustrates a network architecture of a cloud-based crowd-servicing image-based brand visibility system in some embodiments that provides an online dashboard and application service for instant brand visibility.

FIG. 5 conceptually illustrates a network architecture of a cloud-based crowd-servicing image-based brand visibility system in some embodiments that provides an online dashboard and application service for instant brand visibility.

By way of example, FIG. 5 conceptually illustrates a network architecture of a cloud-based crowd-servicing image-based brand visibility system that provides an online dashboard and application service for instant brand visibility 500 (referred to as "cloud-based system crowd-servicing image-based brand visibility system 500" in this example). The cloud-based system crowd-servicing image-based brand visibility system 500 shown in this figure hosts software application web services (or SaaS web applications) for an online brand dashboard program and a crowd-servicing image-based brand visibility user mobile app (which run on mobile devices, desktop/laptop computers, etc.).

As shown in this figure, the cloud-based system crowd-servicing image-based brand visibility system 500 includes first user mobile device 510, a second user mobile device 520, a brand user computing device 530, a brand/admin user mobile device 540, a wireless communication point 522 (e.g., a cell tower for cellular data communication), a gateway 524, a set of user/brand registration and login authentication server computing devices 550, a registered user/brand accounts database 560, a specific first brand server 570 with dashboard and task creation server modules, a completed tasks database 580, a dashboard task creation history database 590, a second brand server 575, a third brand server 585, and a task blasting and task review validation server 595. In some embodiments, the specific first brand server 570 includes an online dashboard service 572, the payment processing module 574, a data and image encryption module 576, and a mobile app version manager 578.

In some embodiments, a brand user uses a computing device, such as the brand user computing device 530 to connect to the specific first brand 570 (via properly authenticated login at the user/brand registration and login authentication server computing devices 550) in order to access a specific online brand dashboard associated with the brand, as provided via the online dashboard service 572. Through the specific online brand dashboard, the brand user may create a task, specify task details and a geographical area in which to broadcast the task. When creation of the task is completed, the specific first brand server 570 stores the created task in the dashboard task creation history database 590 and transmits the task to the task blasting and task review validation server 595 for geotargeted broadcasting to users in the defined geographical area. For example, if the first user and the second user are present in the defined geographical area, then the first user mobile device 510 and the second user mobile device 520 would receive a notification of the task.

Those users would likely be automatically logged in when the mobile app on the first user mobile device 510 and the second user mobile device 520 is launched. However, if their mobile app is configured to provide login details every time the mobile app is launched, then each respective user would provide their login credentials, which would be sent to the user/brand registration and login authentication server computing devices 550 when connecting by way of a wireless connection to the wireless communication point 522 and through the gateway 524 over the cloud. Then, when each respective user completes the task, the first user mobile device 510 and the second user mobile device 520 sends the completed task and associated data/photos to the task blasting and task review validation server 595 for review. When a completed task is rejected, the task blasting and task review validation server 595 sends the rejection back to the associated user. On the other hand, when the completed task is approved, the task blasting and task review validation server 595 sends the details, data, and photos of the approved task to the specific first brand server 570 for storage in the completed task database 580, from which aggregated task details can be used to generate reports for the brand.

As a person of ordinary skill in the relevant art would appreciate, each of the second brand server 575 and the third brand server 585 may also be connected to the wider cloud through private/encrypted clouds which encapsulate and protect their own brand data, as well as allows them to create tasks for broadcasting by the task blasting and task review validation server 595, as noted above in connection with the specific first brand server 570.

Furthermore, many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 6:
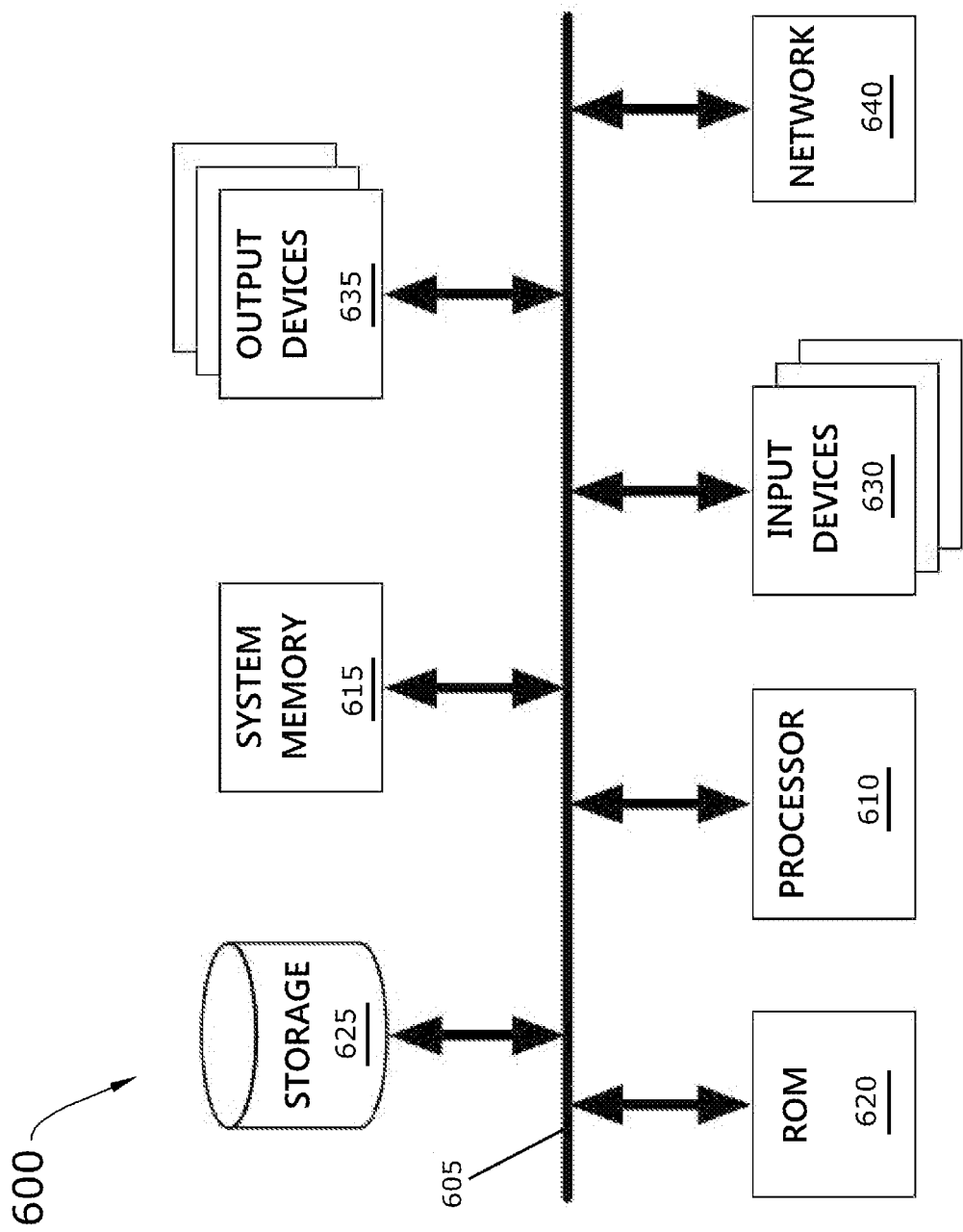
FIG. 6 conceptually illustrates an electronic system with which some embodiments of the invention are implemented.

FIG. 6 conceptually illustrates an electronic system 600 with which some embodiments of the invention are implemented. The electronic system 600 may be a computer, phone, PDA, or any other sort of electronic device. Such an electronic system includes various types of computer readable media and interfaces for various other types of computer readable media. Electronic system 600 includes a bus 605, processing unit(s) 610, a system memory 615, a read-only 620, a permanent storage device 625, input devices 630, output devices 635, and a network 640.

The bus 605 collectively represents all system, peripheral, and chipset buses that communicatively connect the numerous internal devices of the electronic system 600. For instance, the bus 605 communicatively connects the processing unit(s) 610 with the read-only 620, the system memory 615, and the permanent storage device 625.

From these various memory units, the processing unit(s) 610 retrieves instructions to execute and data to process in order to execute the processes of the invention. The processing unit(s) may be a single processor or a multi-core processor in different embodiments.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 625.

Other embodiments use a removable storage device (such as a floppy disk or a flash drive) as the permanent storage device 625. Like the permanent storage device 625, the system memory 615 is a read-and-write memory device. However, unlike storage device 625, the system memory 615 is a volatile read-and-write memory, such as a random access memory. The system memory 615 stores some of the instructions and data that the processor needs at runtime. In some embodiments, the invention's processes are stored in the system memory 615, the permanent storage device 625, and/or the read-only 620. For example, the various memory units include instructions for processing appearance alterations of displayable characters in accordance with some embodiments. From these various memory units, the processing unit(s) 610 retrieves instructions to execute and data to process in order to execute the processes of some embodiments.

The bus 605 also connects to the input and output devices 630 and 635. The input devices enable the user to communicate information and select commands to the electronic system. The input devices 630 include alphanumeric keyboards and pointing or cursor control devices. The output devices 635 display images generated by the electronic system 600. The output devices 635 include printers and display devices, such as cathode ray tubes (CRT) or liquid crystal displays (LCD). Some embodiments include a touchscreen that functions as both an input and output device.

Finally, as shown in FIG. 6, bus 605 also couples electronic system 600 to a network 640 through a network adapter (not shown). In this manner, the computer can be a part of a network of computers (such as a local area network ("LAN"), a wide area network ("WAN"), or an Intranet), or a network of networks (such as the Internet). Any or all components of electronic system 600 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by sets of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only or recordable discs (e.g., CD-ROM, CD-R, CD-RW, DVD-ROM, DVD-RAM, DVD-RW, read-only and recordable Blu-Ray® discs, ultra density optical discs, etc.), flash memory (e.g., SD cards, mini-SD cards, micro-SD cards, etc.), and/or magnetic and/or solid state hard drives (e.g., SSD). The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, many of the examples described above pertain to task blasting to enhance product or brand visibility. Yet task blasting can also become a live human search engine where you can blast out anything you want to see and people will grab the task, take photos, and show you real time results. Or in another example, investigators can blast out alerts to get live real time photos of various things and anyone near that area can deliver the task quickly and give them insight to what is needed. Furthermore, several descriptions relate to processes and method. In particular, FIGS. 1-4 conceptually illustrate some of these processes. The specific operations of each process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

I claim:

1. A non-transitory computer readable medium storing a brand dashboard program which, when executed by a processor of a computing device, broadcasts a geotargeted task created for a brand based on brand criteria, said brand dashboard program comprising sets of instructions for:
    receiving a selection, by a brand user authorized by a brand to create tasks, within an online brand dashboard service to create a task associated with a product offered by the brand;
    determining whether a product page associated with the product offered by the brand is available for selection;
    creating the product page associated with the product offered by the brand when not available for selection;
    receiving a selection of the product page associated with the product offered by the brand;
    receiving a choice of an automated task time schedule that specifies a time period for completion of requirements of the task;
    receiving one or more selections of data to be collected for the task, wherein the data to be collected comprises one or more of visual data, empirical observational information, and objective hard data;
    receiving a selection of a geotargeted location to broadcast the task;
    fully configuring the task with the geotargeted location, the data to be collected, the automated task time schedule and the requirements for task completion, and the product page associated with the product offered by the brand;
    transmitting the fully-configured task to a platform for broadcasting to users within the geotargeted location;
    receiving, by the online brand dashboard service, completed task acceptance notifications associated with particular users who accurately completed the fully-configured task;
    loading a required task compliance artificial intelligence (AI) module and an image recognition AI module;
    retrieving, by the required task compliance AI module, a list of the requirements for the fully-configured task;
    comparing, by the required task compliance AI module, the retrieved list of requirements for the fully-configured task with completed task items of the fully-configured task accurately completed by each particular user associated with a completed task acceptance notification, wherein the image recognition AI module uses an artificial intelligence engine and machine learning sub-system to identify image elements within user-submitted photos and compare the image elements to one or more expected image elements assigned for an image requirement of the full-configured task; and
    distributing cash reward funds, by the brand, to financial accounts associated with the particular users who accurately completed the fully-configured task.

2. The non-transitory computer readable medium of claim 1, wherein the time period specified in the automated task time schedule comprises a near real time frame associated with at least one of a product sale related to the product offered by the brand and maintaining product shelf space for the product offered by the brand.

3. The non-transitory computer readable medium of claim 1, wherein the visual data to be collected comprises at least one of visual image data captured by a camera, photos captures by the camera, and visual video data captured by a video camera, wherein the empirical observational information and objective hard data comprises alpha-numeric textual data.

4. The non-transitory computer readable medium of claim 3, wherein the users comprise individuals with smartphone mobile devices that are equipped with onboard cameras, wherein the onboard cameras are configured to capture visual image data, photos, and visual video data.

5. The non-transitory computer readable medium of claim 4, wherein the smartphone mobile device of each user includes a mobile app which receives the broadcast notification of the task and displays the received broadcast notification as a new task notification which the user can accept to complete for a cash reward.

6. The non-transitory computer readable medium of claim 5, wherein the new task notification comprises a brief summary of the task.

7. The non-transitory computer readable medium of claim 6, wherein when the user accepts the new task, the user starts completing requirements for the task that include at least one photo requirement in a retail store.

* * * * *